United States Patent Office 3,535,320
Patented Oct. 20, 1970

3,535,320
DERIVATIVES OF 1,2,8,9-TETRAAZAPHENALENES
Karl J. Doebel, Ossining, and John E. Francis, Pleasantville, N.Y., assignors to Geigy Chemical Corporation, Ardsley, N.Y., a corporation of New York
No Drawing. Continuation-in-part of applications Ser. No. 445,762, Apr. 5, 1965, Ser. No. 539,303, Apr. 1, 1966, and Ser. No. 583,980, Oct. 3, 1966. This application Nov. 13, 1968, Ser. No. 775,491
Int. Cl. C07d 51/78
U.S. Cl. 260—250      5 Claims

ABSTRACT OF THE DISCLOSURE 3,7-diketo-2,3,7,8-tetrahydro - 1,2,8,9 - tetraazaphenalene is prepared by treating a 3-carboxy derivative of phthalic acid with hydrazine. The compound possesses hypotensive properties and is a chemical intermediate.

CROSS REFERENCE

This is a continuation-in-part of copending applications Ser. Nos. 583,980, 539,303 and 445,762 filed Oct. 3, 1966, Apr. 1, 1966 and Apr. 5, 1965 respectively, all now abandoned, Ser. No. 539,303 being a continuation-in-part of Ser. No. 445,762 and Ser. No. 583,980 being a continuation-in-part of Ser. Nos. 539,303 and 445,767.

DETAILED DESCRIPTION

This invention pertains to a process for the preparation of 1,2,8,9-tetraazaphenalenes and to the compounds thereby produced. In particular, the present invention comprises heating a compound of the formula:

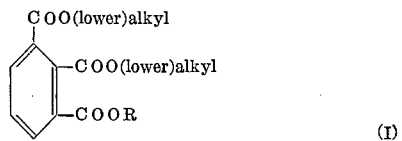

(I)

wherein R is hydrogen or (lower)alkyl, with at least two equimolar amounts of hydrazine until formation of 3,7-diketo-2,3,7,8-tetrahydro-1,2,8,9-tetraazaphenalene is complete.

The reaction is carried out with aqueous hydrazine or 100% hydrazine in an organic solvent such as ethanol, methyl Cellosolve, diethylene glycol or diglyme, generally at reflux temperature until the reaction is complete, a period generally of from 16 to 48 hours.

The term "alkyl" denotes a straight or branched hydrocarbon chain. When qualified by the designation "(lower)" such a chain will contain up to and including 6 carbon atoms. Illustrative of such alkyl groups are methyl, ethyl, propyl, isopropyl, butyl, sec-butyl, t-butyl, pentyl, hexyl, and the like.

The compounds of the present invention are identified herein as derivatives of the novel parent tricyclic nucleus 1,2,8,9-tetraazaphenalene which is assigned the following numbering.

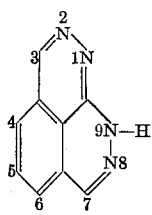

The product of this process may exist in several tautomeric forms, two of which may be represented as follows:

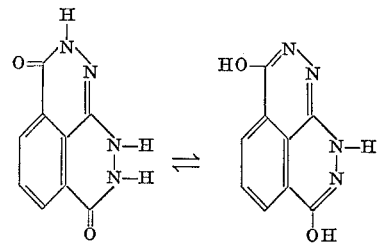

3,7-diketo-2,3,7,8 - tetrahydro - 1,2,8,9-tetraazaphenalene is a cardiovascular agent, in particular a blood-pressure lowering agent. It also manifests coronary and peripheral vascular dilation properties, and anti-inflammatory activity.

The compound can be administered parenterally or orally in any of the usual pharmaceutical forms including tablets, capsules, powders, suspensions, solutions, syrups and the like, including sustained release preparations which can be compounded by any of the known procedures. In addition 3,7-diketo-2,3,7,8-tetrahydro-1,2,8, 9-tetraazaphenalene is a valuable chemical intermediate. Thus, for example, treatment with phosphorus pentachloride and phosphorus oxychloride yields the novel 3,7-dichloro-1,2,8,9-tetraazaphenalene which is also a versatile intermediate. For example, refluxing this dichloro compound with red phosphorus and hydriodic acid yields the known 1,2,8,9-tetraazaphenalene.

Also included within the scope of the present invention are the acid addition salts of these novel tetraazaphenalene derivatives, obtained via the conventional methods. Typical salts thus include those derived from hydrochloric, hydrobromic, sulfuric, phosphoric, methanesulfonic, acetic, lactic, succinic, embonic, malic, maleic, aconitic, phthalic, tartaric and the like acids. Quaternary salts derived from alkyl halides are also within the scope of this invention.

The following examples, presented for illustration and not limitation, will serve to further typify the nature of the present invention. In these examples temperature is expressed in degrees centigrade.

EXAMPLE 1

3,7-diketo-2,3,7,8-tetrahydro-1,2,8,9-tetraazaphenalene

Trimethyl hemimellitate (2.52 g.) (ref. Graebe and Leonhardt, Ann. 290, 217 (1896); Graebe and Bossel, Ber. 26, 1797 (1898)), hydrazine hydrate (20 ml.) and methyl Cellosolve (80 ml.) are heated for 46 hours under reflux. A thick orange-yellow precipitate forms. The mixture is cooled and filtered and the solid washed well with water and methanol and dried in vacuo to yield the title compound as a yellow solid, M.P.>350°.

The same product, as shown by infrared spectroscopy, is obtained by reacting 3-carboxydimethylphthalate (4.75 g.) (ref. Wenkert, Johnston and Dave, J. Org. Chem. 29, 2534 (1964)) with hydrazine hydrate (30 ml.) and water (30 ml.) under reflux for 47 hours. The yield is 1.5 g.

EXAMPLE 2

3,7-dichloro-1,2,8,9-tetraazaphenalene

A mixture of phosphorus pentachloride (25 g.), phosphorus oxychloride (125 cc.) and the intermediate from Example 1 (10 g.) is heated at reflux under moisture exclusion for 22 hours. The dark mixture is cooled and poured into ice-water. The yellow precipitate which results is collected, washed with a little water and dried to yield 3,7-dichloro-1,2,8,9-tetraazaphenalene, M.P. 330°.

EXAMPLE 3

1,2,8,9-tetraazaphenalene

A mixture of red phosphorus (8 g.), 47% hydriodic acid (120 ml.) and 3,7-dichloro-1,2,8,9-tetraazaphenalene (500 mg.) is stirred at reflux for 18 hours. It is cooled and filtered to remove phosphorus. The filtrate is concentrated to about half the volume, neutralized with 5% sodium carbonate solution and evaporated to dryness in vacuo. The residue is taken up in 200 ml. of hot ethanol and refiltered. The filtrate is evaporated to dryness in vacuo, taken up in water, and treated with a little sodium metabisulphite and 5 drops of glacial acetic acid to remove the color. The solution is stirred with 200 ml. of hot chloroform, the mixture is filtered, and the chloroform layer is evaporated to dryness in vacuo to yield 1,2,8,9-tetraazaphenalene which is identical with the known compound in thin layer chromatography in four different systems (acetone, methanol, methyl Cellosolve with 1:5 dimethylformamide-benzene).

What is claimed is:

1. A process which comprises heating a phthalic acid derivative of the formula:

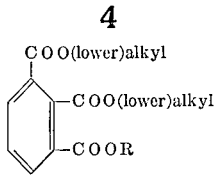

wherein R is hydrogen or (lower)alkyl, with at least two equimolar amounts of hydrazine until formation of 3,7-diketo-2,3,7,8-tetrahydro-1,2,8,9-tetraazaphenalene is complete.

2. The process of claim 1 wherein said phthalic acid derivative is trimethyl hemimellitate.

3. The process of claim 1 wherein said phthalic acid derivative is 3-carboxydimethylphthalate.

4. 3,7 - diketo - 2,3,7,8-tetrahydro-1,2,8,9-tetraazaphenalene.

5. 3,7-dichloro-1,2,8,9-tetraazaphenalene.

No references cited.

NICHOLAS S. RIZZO, Primary Examiner

U.S. Cl. X.R.

260—999